United States Patent
Sato

(10) Patent No.: US 11,520,716 B2
(45) Date of Patent: Dec. 6, 2022

(54) INFORMATION PROCESSING SYSTEM, STORAGE DEVICE, AND CALIBRATION METHOD

(71) Applicant: KIOXIA CORPORATION, Tokyo (JP)

(72) Inventor: Masayoshi Sato, Yokohama Kanagawa (JP)

(73) Assignee: KIOXIA CORPORATION, Tokyo (JP)

( * ) Notice: Subject to any disclaimer, the term of this patent is extended or adjusted under 35 U.S.C. 154(b) by 0 days.

(21) Appl. No.: 17/190,134

(22) Filed: Mar. 2, 2021

(65) Prior Publication Data

US 2022/0083478 A1    Mar. 17, 2022

(30) Foreign Application Priority Data

Sep. 16, 2020   (JP) .............................. JP2020-155600

(51) Int. Cl.
*G06F 13/16* (2006.01)
*G06F 13/42* (2006.01)
*H04L 25/03* (2006.01)

(52) U.S. Cl.
CPC ...... *G06F 13/1668* (2013.01); *G06F 13/4282* (2013.01); *H04L 25/03057* (2013.01); *G06F 2213/0028* (2013.01)

(58) Field of Classification Search
CPC ............. G06F 13/1668; G06F 13/4282; G06F 2213/0028; H04L 25/03057
See application file for complete search history.

(56) References Cited

U.S. PATENT DOCUMENTS

| 7,801,205 | B2 | 9/2010 | Nagatani |
| 10,623,172 | B2 | 4/2020 | Matsui et al. |
| 2009/0068958 | A1* | 3/2009 | Nakamura ......... H03H 11/1291 375/226 |
| 2014/0072023 | A1* | 3/2014 | Mellitz ................. H04B 3/487 375/227 |
| 2014/0244904 | A1* | 8/2014 | Kondo ............... G06F 13/1684 711/103 |
| 2014/0351359 | A1* | 11/2014 | Grocutt .................... G06F 1/12 709/209 |

(Continued)

FOREIGN PATENT DOCUMENTS

| JP | 2009042231 A | 2/2009 |
| JP | 2014154963 A | 8/2014 |
| JP | 2020017853 A | 1/2020 |

*Primary Examiner* — Henry Tsai
*Assistant Examiner* — Harry Z Wang
(74) *Attorney, Agent, or Firm* — Kim & Stewart LLP

(57) ABSTRACT

An information processing system includes a host and a storage device that transmits a first pulse signal to the host and receives a second pulse signal from the host through a transmission line. The storage device has a first register to store a value of a first parameter and correction circuit to adjust a first duty ratio of the first pulse signal according to the value of the first parameter. The host includes a first calibration processor that measures a plurality of the first duty ratios as output from the storage device for different values of the first parameter to derive a first optimum value based on the measured first duty ratios and transmit the derived first optimum value to the storage device as the value of the first parameter to be stored in the first register.

18 Claims, 11 Drawing Sheets

(56) References Cited

U.S. PATENT DOCUMENTS

| | | | |
|---|---|---|---|
| 2016/0118088 A1* | 4/2016 | Lee | G11C 16/08 |
| | | | 365/191 |
| 2017/0249412 A1 | 8/2017 | Subramanian et al. | |
| 2018/0090191 A1* | 3/2018 | Jeong | G11C 7/222 |
| 2018/0276164 A1 | 9/2018 | Das Sharma et al. | |
| 2019/0073255 A1 | 3/2019 | Sato et al. | |
| 2019/0237127 A1* | 8/2019 | Moon | G11C 11/409 |

* cited by examiner

INFORMATION PROCESSING SYSTEM, STORAGE DEVICE, AND CALIBRATION METHOD

CROSS-REFERENCE TO RELATED APPLICATION

This application is based upon and claims the benefit of priority from Japanese Patent Application No. 2020-155600, filed Sep. 16, 2020, the entire contents of which are incorporated herein by reference.

FIELD

Embodiments described herein relate generally to an information processing system, a storage device, and a calibration method.

BACKGROUND

In an information processing system in which a host and a storage device transmit and receive signals to and from each other through a transmission line, the signal transmission rate has remarkably increased in recent years. With increased transmission rates, the required signal quality level becomes stricter. One way to improve signal quality is to prevent or reduce jitter, which is one of the factors that might deteriorate the signal quality, it is required to improve the accuracy in the duty ratio (also referred to as a duty cycle) of a signal pulse transmitted over the transmission line.

DETAILED DESCRIPTION

Embodiments provide an information processing system, a storage device, and a calibration method capable of appropriately adjusting a duty ratio of a pulse signal that is transmitted through a transmission line.

According to one or more embodiments, an information processing system includes a host and a storage device. The storage device is configured to transmit a first pulse signal to the host through a transmission line and receive a second pulse from the host through the transmission. The storage device has a first register configured to store a value of a first parameter. The storage device also has a first correction circuit configured to adjust a first duty ratio of the first pulse signal according to the value of the first parameter in the first register. The host includes a first calibration processor that is configured to: measure a plurality of first duty ratios of the first pulse signal as output from the storage device with the value of the first parameter in the first register being set to a plurality of different values; derive a first optimum value for the first parameter based on the measured first duty ratios adjusted according to the plurality of values of the first parameter; and transmit the derived first optimum value to the storage device as the value of the first parameter to be stored in the first register.

Hereinafter, certain example embodiments will be described with reference to the accompanying drawings.

First Embodiment

Figure 1:
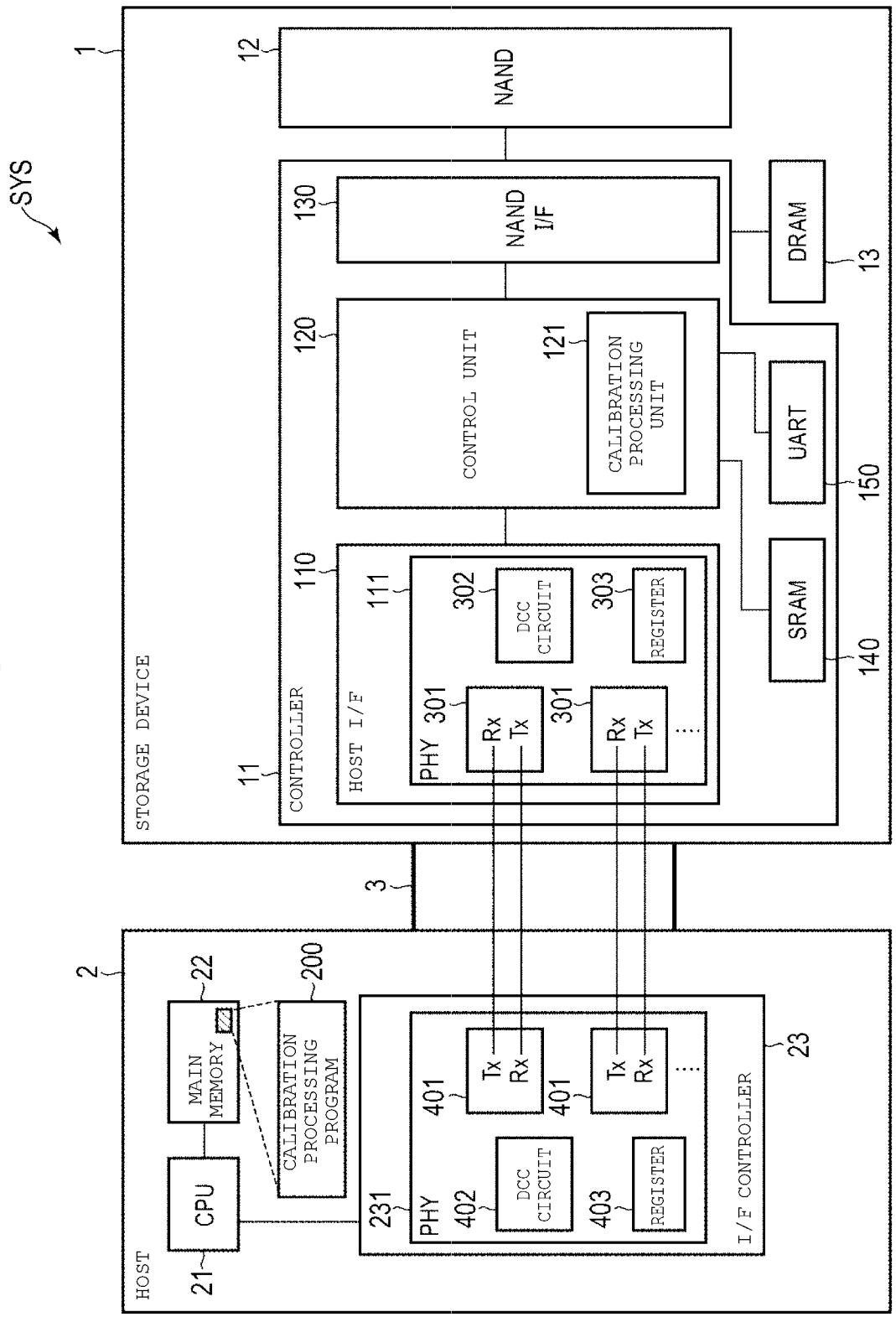
FIG. 1 depicts an information processing system according to a first embodiment.

FIG. 1 depicts an example configuration of an information processing system SYS of a first embodiment.

As shown in FIG. 1, in the information processing system SYS of the first embodiment, a storage device 1 and a host 2 are connected through a transmission line such as an interface 3 or the like. The storage device 1 may be, for example, a solid-state drive (SSD). The host 2 may be a server, a personal computer, or the like. The interface 3 may be of a type complying with standards such as Serial Attached SCSI (SAS), Serial ATA (SATA), and PCI Express (PCIe®). The storage device 1 may be a device complying with a universal flash storage (UFS) standard.

The storage device 1 includes a controller 11, a NAND flash memory 12 ("NAND 12"), and a DRAM 13.

The controller 11 executes a write operation of data to the NAND 12 and a read operation of data from the NAND 12 according to a command from the host 2. The controller 11 includes a host interface circuit 110 ("host I/F 110"), a control unit 120, a NAND interface circuit 130 ("NAND I/F 130"), an SRAM 140, and a universal asynchronous receiver/transmitter (UART) 150. The controller 11 is configured as, for example, a system on a chip (SoC).

The host I/F 110 controls communication with the host 2. The host I/F 110 includes a PHY 111. The PHY 111 is a circuit that provides a function of a physical layer of a lowest layer in the Open Systems Interconnection (OSI) layer model. The PHY 111 includes a plurality of ports/lanes 301, a duty cycle correction (DCC) circuit 302, and a register 303.

Each port/lane 301 includes a set of a transmission circuit Tx for transmitting a signal and a reception circuit Rx for receiving a signal. The signal may be, for example, a pulse signal. When the interface 3 complies with SAS or SATA, the port/lane 301 functions as a "port" in the PHY 111 of the host I/F 110. When the interface 3 complies with PCIe, the port/lane 301 functions as a "lane" in the PHY 111 of the host I/F 110.

The DCC circuit 302 adjusts a duty ratio (also referred to as a duty cycle) of the pulse signal output from the transmission circuit Tx of the port/lane 301 to the interface 3. The register 303 stores a parameter for correcting a result for adjusting the duty ratio by the DCC circuit 302. This parameter can also be referred to as a "Count" herein. In a case where the DCC circuit 302 cannot completely, or to a desired extent, adjust the duty ratio of the pulse signal or where the adjusted result deviates due to a design defect, an individual defect, a compatibility problem, and the like, the duty ratio of the pulse signal can be corrected by setting the Count by reference to the register 303. The Count of each port/lane 301 is stored in the register 303.

The control unit 120 controls components and the like in the storage device 1. The control unit 120 includes a calibration processing unit 121, such as a calibration processor. The calibration processing unit 121 cooperates with the host 2 to set an optimum value of the Count in the register 303. The calibration processing unit 121 calibrates the pulse signal transmitted and received to and from the host 2.

The NAND I/F 130 controls writing of data to the NAND 12, reading of data from the NAND 12, and erasing of data stored in the NAND 12 under the control of the control unit 120.

The SRAM 140 is a storage that volatilely stores data. The SRAM 140 is used, for example, as a loading area of a firmware stored in the NAND 12.

The UART 150 is a circuit for inputting commands and parameters from the outside via a connector complying with, for example, a universal serial bus (USB) standard or other interface standards.

The NAND 12 is a storage that stores data in a nonvolatile manner. The DRAM 13 is a storage that volatilely stores data. The DRAM 13 is used, for example, as a buffer area for data to be written to the NAND 12 and data read from the NAND. In one instance, the DRAM 13 may be provided in the controller 11.

The host 2 includes a CPU 21, a main memory 22, and an interface (I/F) controller 23. The CPU 21, for example, loads various programs from the storage device 1 to the main memory 22 and executes the programs. The programs include but not limited to a calibration processing program 200. The calibration processing program 200 cooperates with the storage device 1 to derive the optimum value of the Count for each of the storage device 1 and the host 2. For example, the calibration processing program 200 may be a module provided in the host 2 corresponding to the calibration processing unit 121 of the storage device 1.

The I/F controller 23 is a bridge device that relays between the CPU 21 of the host 2 and the storage device 1. Further, the I/F controller 23 has a built-in PHY 231 paired with the PHY 111 of the storage device 1.

The PHY 231 of the host 2 also includes a plurality of ports/lanes 401, a DCC circuit 402, and a register 403 like the PHY 111 of the storage device 1. As shown in FIG. 1, there is a one-to-one correspondence between the plurality of ports/lanes 401 of the host 2 and the plurality of ports/lanes 301 of the storage device 1. For example, the pulse signal output from the transmission circuit Tx of one of the ports/lanes 401 of the host 2 is input to the reception circuit Rx of one of the ports/lanes 301 of the storage device 1 that corresponds to or is paired with the port/lane 401 used for that transmission. Likewise, the pulse signal output from the transmission circuit Tx of one of ports/lanes 301 of the storage device 1 is input to the reception circuit Rx of one of the ports/lanes 401 of the host 2 that corresponds to or paired with the port/lane 301 used for that transmission. The duty ratio of the pulse signal output from the transmission circuit Tx of the port/lane 301 of the storage device 1 is adjusted by the DCC circuit 302. Ina case where the adjustment of the duty ratio by the DCC circuit 302 is not sufficient, the duty ratio can be corrected by setting the Count in the register 303. The duty ratio of the pulse signal output from the transmission circuit Tx of the port/lane 401 of the host 2 is adjusted by the DCC circuit 402. In a case where the adjustment of the duty ratio by the DCC circuit 402 is not sufficient, the duty ratio can be corrected by setting the Count in the register 403.

Figure 2:
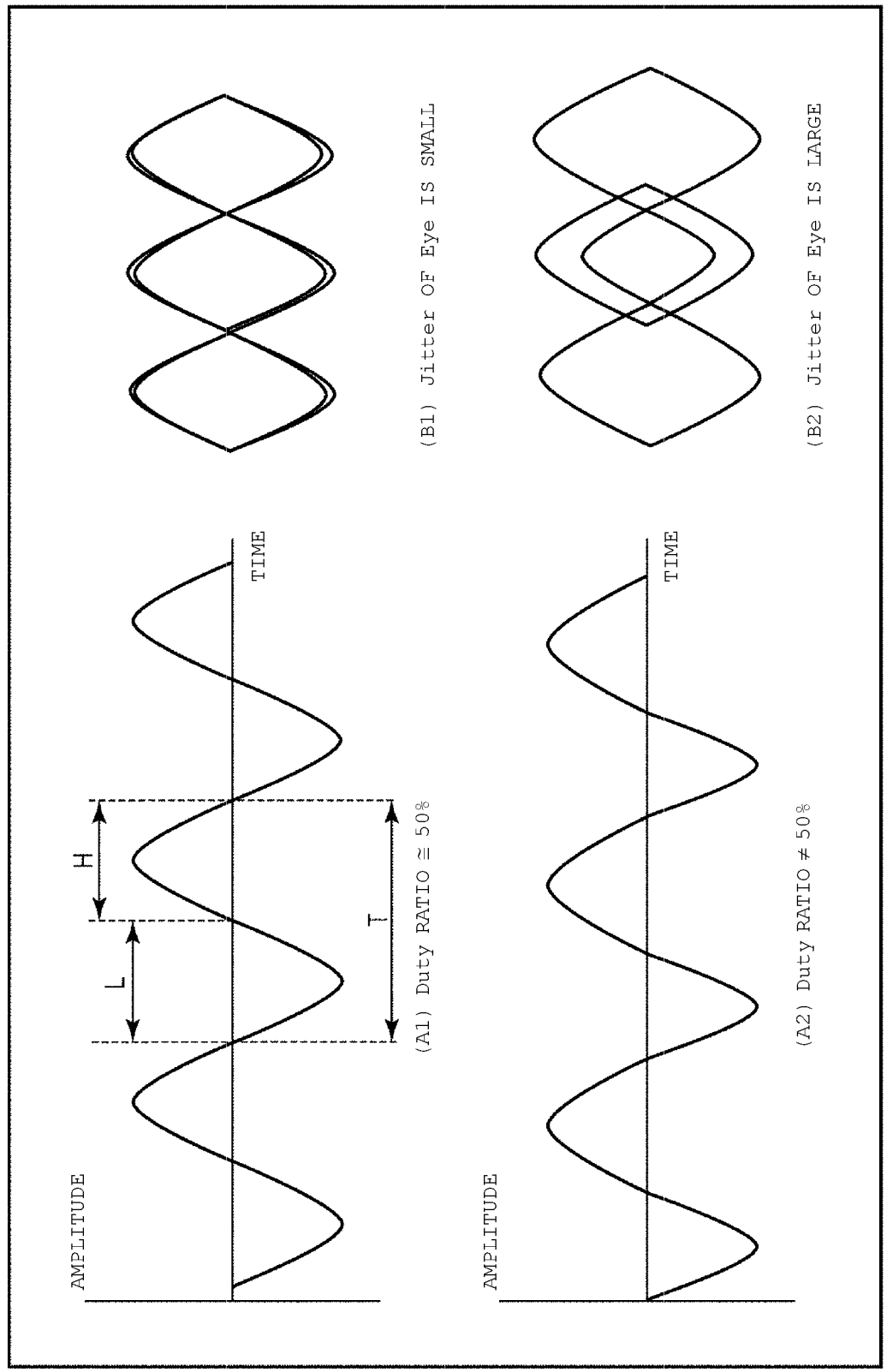
FIG. 2 depicts a comparison between a case where a duty ratio of a pulse signal is sufficiently adjusted and a case where the duty ratio is not sufficiently adjusted.

FIG. 2 is a diagram showing a comparison between a case where a duty ratio of a pulse signal is sufficiently adjusted and a case where a duty ratio of a pulse signal is not sufficiently adjusted.

For example, the waveform of the signal transmitted and received between the storage device 1 and the host 2 is stable at a duty ratio in the vicinity of 50%, that is ideal in one instance. One example of a pulse signal in a stable state at a duty ratio in the vicinity of 50% is designated as A1 in FIG. 2. The vertical axis represents amplitude, and the horizontal axis represents time. The duty ratio can be obtained as:

$$\text{duty ratio}[\%] = (H/T) \times 100$$

where T is a pulse period and H is a pulse width during a period when the amplitude is positive (or a "High" time). If a pulse width in a period when the amplitude is negative (or a "Low" time) is L, T=H+L.

One example of a waveform obtained by observing the pulse signal in the state of A1 with an oscilloscope or the like is designated as B1 in FIG. 2. The stable state at the duty ratio in the vicinity of 50% is a state in which jitter, one of the factors that affect a signal quality, is prevented or minimized. This state is referred to as "Jitter of Eye is small" or the like. The DCC circuits 302 and 402 adjust the duty ratios of the pulse signals output from the transmission circuits Tx of the ports/lanes 301 and 401 so that each pulse signal becomes stable in the vicinity of 50%.

On the other hand, when the adjustment by the DCC circuits 302 and 402 is not sufficient, the duty ratio deviates from the vicinity of 50%. One example of a pulse signal in a state where H (High time) is significantly larger than L (Low time) is designated as A2 in FIG. 2. One example of a waveform obtained by observing the pulse signal in the state of A2 with an oscilloscope or the like is designated as B2 in FIG. 3. The state in which the duty ratio deviates from the vicinity of 50% is a state in which the jitter is not prevented or not sufficiently mitigated. This state is referred to in this context as "Jitter of Eye is large" or the like. When the jitter becomes large, there is a possibility of inducing various defects related to the interface (such as error events at the interface 3).

In the information processing system SYS of the first embodiment, the host 2 and the storage device 1 cooperate with each other to appropriately execute calibration, or set the parameter referred to as Count, for preventing or sufficiently mitigating such jitter. Such calibration may be referred to as jitter calibration herein.

Figure 3:
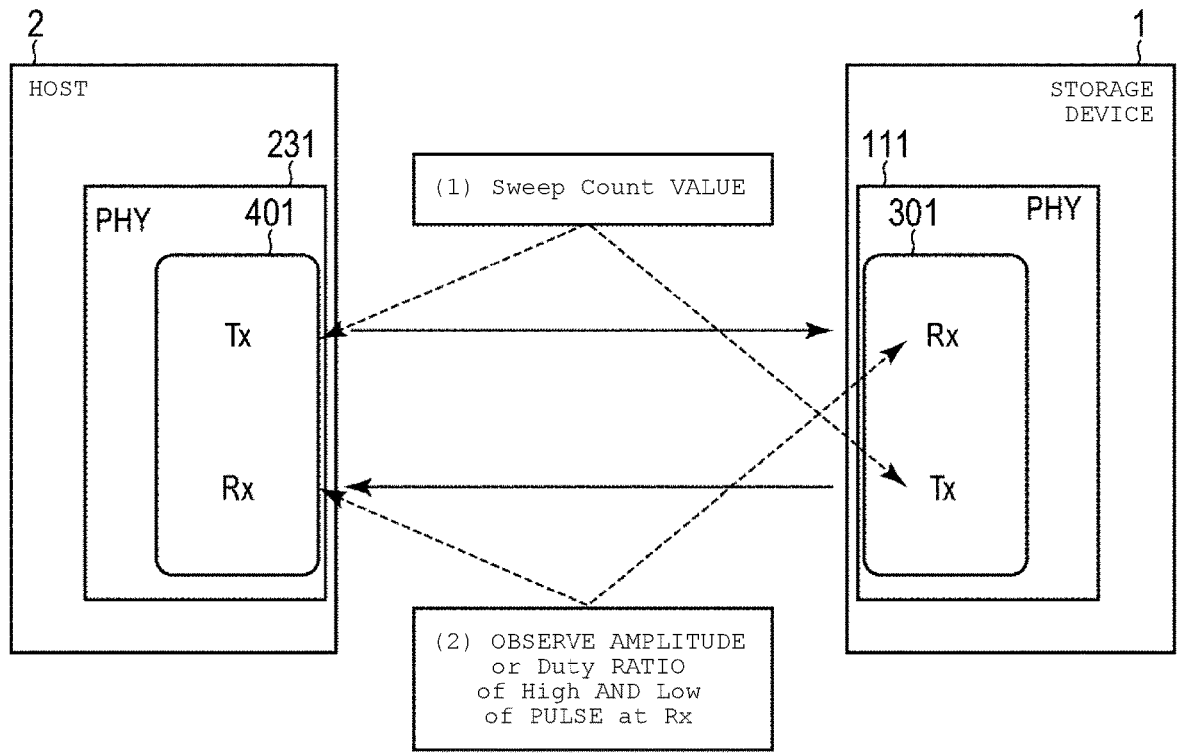
FIG. 3 is a diagram showing an outline of a calibration (a jitter calibration) related to the duty ratio of a pulse signal executed in an information processing system according to a first embodiment.

FIG. 3 depicts an example calibration executed by the storage device 1 and the host 2 in cooperation with each other in the information processing system SYS according to the first embodiment.

In the first embodiment, there is a one-to-one correspondence between the plurality of ports/lanes 401 of the host 2 and the plurality of ports/lanes 301 of the storage device 1. The pulse signal output from the transmission circuit Tx of one of the ports/lanes 401 of the host 2 is input to the reception circuit Rx of one of the ports/lanes 301 of the storage device 1 that corresponds to or paired with the port/lane 401 used for that transmission. The pulse signal output from the transmission circuit Tx of one of the ports/lanes 301 of the storage device 1 is input to the reception circuit Rx of one of the ports/lanes 401 of the host 2 that corresponds to or paired with the port/lane 301 used for that transmission.

The duty ratio of the pulse signal output from the transmission circuit Tx of the port/lane 401 of the host 2 is adjusted by the DCC circuit 402 of the host 2 so as to be stable in the vicinity of 50%. The duty ratio of the pulse signal output from the transmission circuit Tx of the port/lane 301 of the storage device 1 is adjusted by the DCC circuit 302 of the storage device 1 so as to be stable in the vicinity of 50%.

If the adjustment of the duty ratio by the DCC circuit 402 of the host 2 is not sufficient, the duty ratio can be corrected by setting the Count with respect to the register 403 of the host 2. If the adjustment of the duty ratio by the DCC circuit 302 of the storage device 1 is not sufficient, the duty ratio can be corrected by setting the Count with respect to the register 303 of the storage device 1.

Therefore, the information processing system SYS of the first embodiment executes calibration for appropriately setting the Count.

For example, each of the transmission circuits Tx in the storage device 1 and the host 2 changes a value of the Count (or Count value) from a minimum value to a maximum value (process (1) in FIG. 3). When the Count value changes, the duty ratio of the pulse signal output from the transmission circuit Tx changes. Each of the reception circuits Rx in the storage device 1 and the host 2, to which the pulse signal is input, observes the amplitude or duty ratio of High and Low with respect to each Count value (process (2) of FIG. 3). Then, each transmission circuit Tx derives an optimum value of the Count based on this observation result. In one instance, the derivation of the Count value may be executed one by one in order. For example, the derivation of the Count value of the storage device 1 is first executed, and then the derivation of the Count value of the host 2 is executed. In another instance, such derivation may be executed in parallel for both the Count value of the storage device 1 and the Count value of the host 2.

Figure 4:
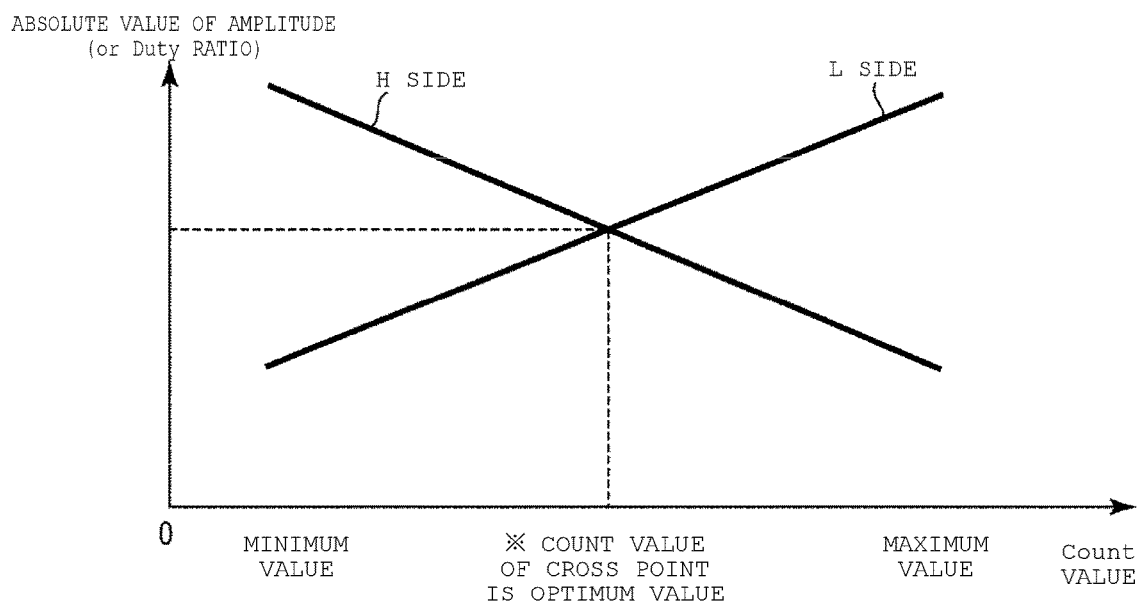
FIG. 4 is a diagram showing an example of an observation result of the pulse signal at the time of calibration executed in an information processing system according to a first embodiment.

FIG. 4 depicts an example result of observation of the pulse signal at the reception circuit Rx corresponding to the transmission circuit Tx from which that pulse signal has been output while changing the Count value from the minimum value to the maximum value.

In FIG. 4, the vertical axis represents an absolute value of the amplitude, and the horizontal axis represents the Count value. While in the present example, the vertical axis represents the absolute value of the amplitude, it may represent the duty ratio in another example.

As shown in FIG. 4, in the pulse signal output from the transmission circuit Tx and input to the corresponding reception circuit Rx, when the Count value is the minimum value, the absolute value of the amplitude on the High side is the maximum while the absolute value of the amplitude on the Low side is the minimum. The amplitude on the High side corresponds to the amplitude of the period H in the pulse signal of the period T shown in FIG. 2, and the amplitude on the Low side corresponds to the amplitude of the period L in the pulse signal of the period T shown in FIG. 2. As the Count value shifts from the minimum value to the maximum value, the absolute value of the amplitude on the High side decreases, and the absolute value of the amplitude on the Low side increases. When the Count value is the maximum value, the absolute value of the amplitude on the High side is the minimum, and the absolute value of the amplitude on the Low side is the maximum.

In one instance, the pulse signal is stable at a duty ratio in the vicinity of 50%. Therefore, when the absolute value of the amplitude on the High side matches the absolute value of the amplitude on the Low side (that is a cross point), the Count value is the optimum value. In the information processing system SYS of the first embodiment, the storage device 1 and the host 2 cooperate with each other to derive, as an optimum value, the Count value when the absolute value of the amplitude on the High side matches the absolute value of the amplitude on the Low side.

Figure 5:
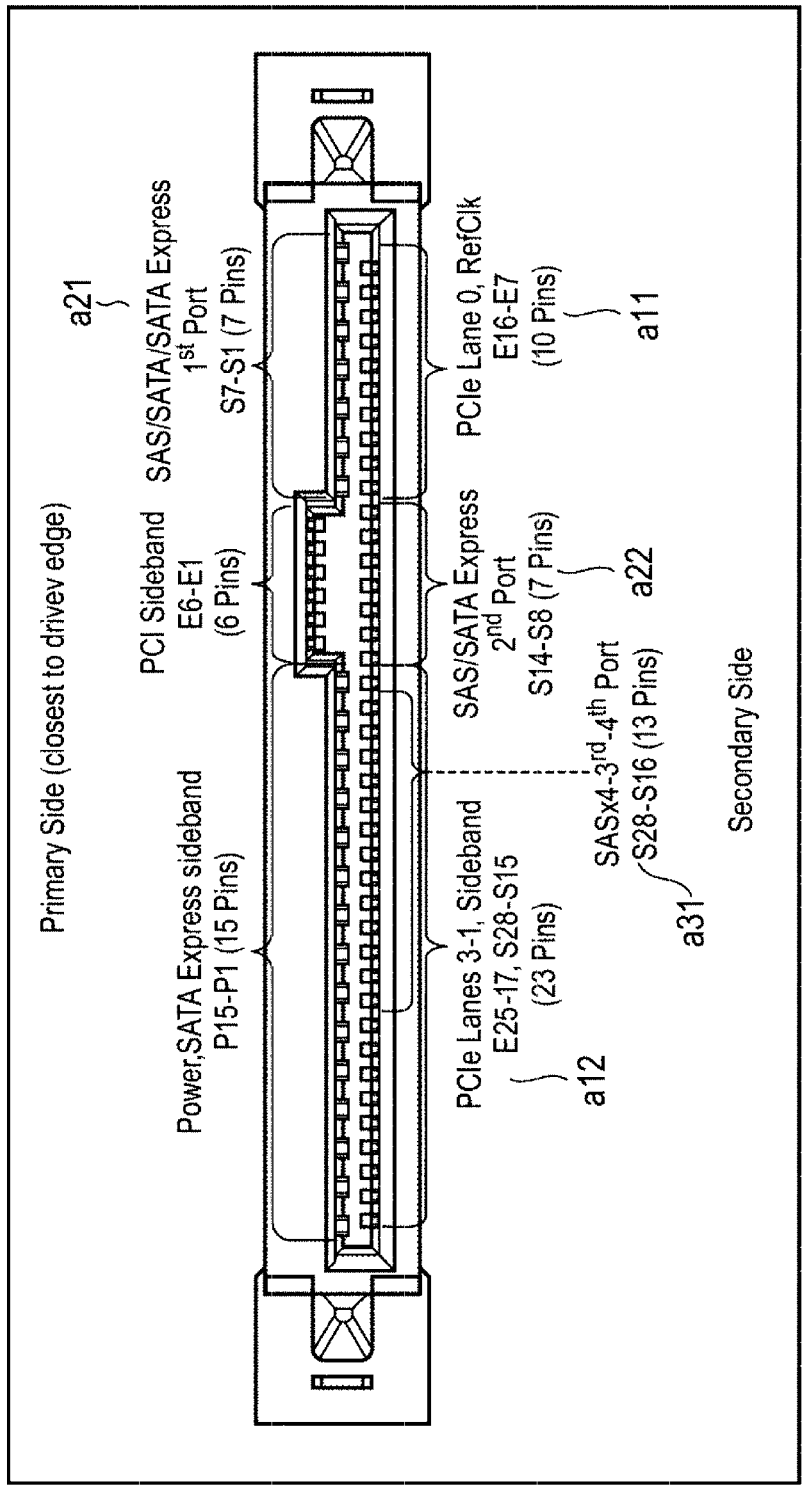
FIG. 5 depicts connectors provided on both a storage device and a host in an information processing system according to a first embodiment.

FIG. 5 depicts an example connector provided on each of the storage device 1 and the host 2 for connection therebetween.

The connector shown in FIG. 5 has a plurality of pins and is able to support each of SAS, SATA, SATA Express, and PCIe standards. In an instance where the storage device 1 and the host 2 are connected via this connector and the standard of the interface 3 is PCIe, four lanes of Lane 0 to Lane 3 can be used (connector portions a11 and a12). If the standard of the interface 3 is SATA, one port ("$1^{st}$ port") can be used (connector portion a21). If the standard of the interface 3 is SAS or SATA Express, two ports including a second port ("$2^{nd}$ port") in addition to the $1^{st}$ port can be used (connector portions a21 and a22). If the standard of the interface 3 is SAS×4, four ports including the third port ("$3^{rd}$ port") and the fourth port ("$4^{th}$ port") in addition to the $1^{st}$ and $2^{nd}$ ports can be used (connector portions a21, a22, and a31).

Figure 6:
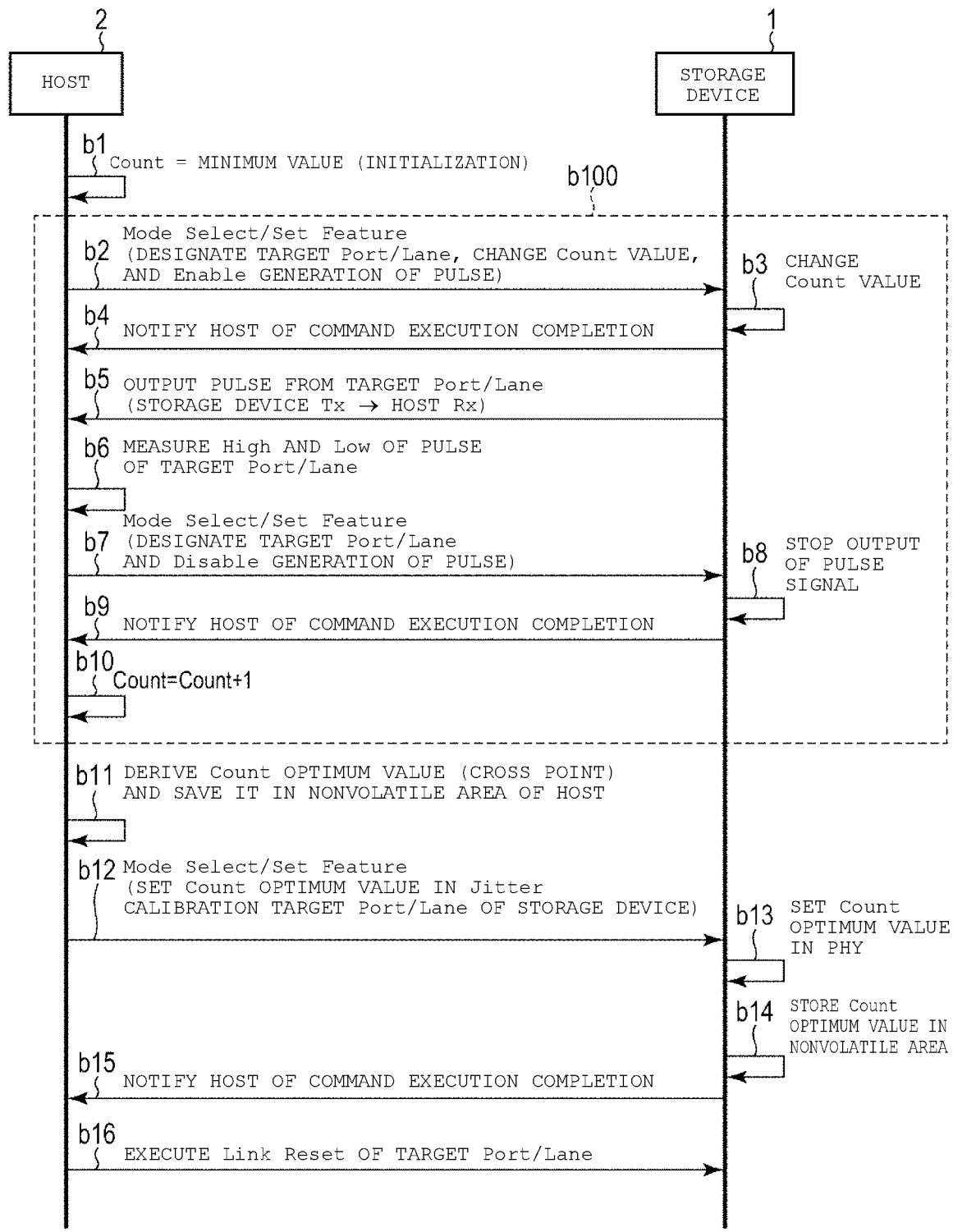
FIG. 6 is a process sequence diagram showing a flow of calibration for a pulse signal output from a storage device, which is executed in an information processing system according to a first embodiment.

FIG. 6 is a sequence diagram of example calibration for a pulse signal output from the transmission circuit Tx of the storage device 1, which is executed in cooperation with the storage device 1 and the host 2 in the information processing system SYS of the first embodiment.

The host 2 (executing the calibration processing program 200) first stores the minimum value of Count as an initial value in an area secured in the main memory 22 to be used for incrementing the Count from the minimum value to the maximum value (b1). The host 2 repeats processes b2 to b10 until the Count stored in this area reaches the maximum value. The processes b2 to b10 are surrounded by the dashed rectangle b100 in FIG. 6.

The host 2 first issues, to the storage device 1, a command (e.g., Mode Select or Set Feature) for designating the port/lane to be calibrated, changing the Count value, and starting output of the pulse signal (b2). The particular port/lane to be calibrated is also referred to as a target port/lane. In addition, in this context a "Mode Select" command is a defined command in SAS for performing a setting change, and a "Set Feature" command is a defined command in NVM Express (NVMe) for performing a setting change. NVMe is an interface standard for storage devices developed based on PCIe. These are examples, and the present disclosure is not limited thereto. In any event, the host 2 issues these commands to the storage device 1 using a port/lane other than the target port/lane. Here, it is assumed that commands are passed from the host 2 to the storage device 1 via the interface 3. However, since the storage device 1 includes the UART 150, commands may be passed via the UART 150 instead of the interface 3. The Count value notified to the storage device 1 in b2 is the Count value previously stored in the area secured on the main memory 22 as described above.

The storage device 1 (or the calibration processing unit 121) changes the Count value corresponding to the designated port/lane in response to a command from the host 2 (b3), and then notifies the host 2 of the command execution completion (b4). This notification may be performed using the port/lane used by the host 2 to issue the command, that is, the notification may be transmitted via a port/lane other than the target port/lane. The storage device 1 also then outputs a pulse signal from the transmission circuit Tx of the target port/lane whose Count value has been changed (b5).

The host 2 measures a high amplitude value and a low amplitude value of the pulse signal input to the reception circuit Rx of the target port/lane (b6). When the measurement is completed, the host 2 issues, to the storage device 1, a command (e.g., Mode Select or Set Feature) for designating the target port/lane and stopping the output of the pulse signal therefrom (b7). The host 2 also issues this command using a port/lane other than the target port/lane. In response to this command, the storage device 1 stops the output of the pulse signal from the transmission circuit Tx of the designated port/lane (b8), and notifies the host 2 of the command execution completion (b9).

The host 2 then increments the Count value (b10) and repeats the processes from b2. When the Count value reaches the maximum value, the host 2 exits the loop of the processes b2 to b10 and then derives an optimum value for the Count for the pulse signal output from the transmission circuit Tx of the storage device 1 based on the result of the measurement(s) in b6 (b11). The host 2 saves the derived Count optimum value in a nonvolatile area, such as a BIOS-ROM of the host 2. The BIOS-ROM is, for example, a flash memory or the like so that the BIOS can be updated from time to time.

The host 2 issues, to the storage device 1, a command (e.g., Mode Select or Set Feature) for setting the derived Count optimum value to the target port/lane (b12). The storage device 1 sets the Count optimum value received from the host 2 in the register 303 of the PHY 111 (b13). Also, in the storage device 1, this Count optimum value is stored in a nonvolatile area such as in the NAND 12 (b14). When the setting and the storing of the Count value are completed, the storage device 1 notifies the host 2 of the command execution completion (b15).

When the notification of the command execution completion is received from the storage device 1, the host 2 executes Link Reset process with the storage device 1 to initialize the target port/lane (b16).

In this way, under the handling of the host 2, the storage device 1 and the host 2 cooperate with each other to implement the calibration for the pulse signal output from the transmission circuit Tx of the storage device 1.

Figure 7:
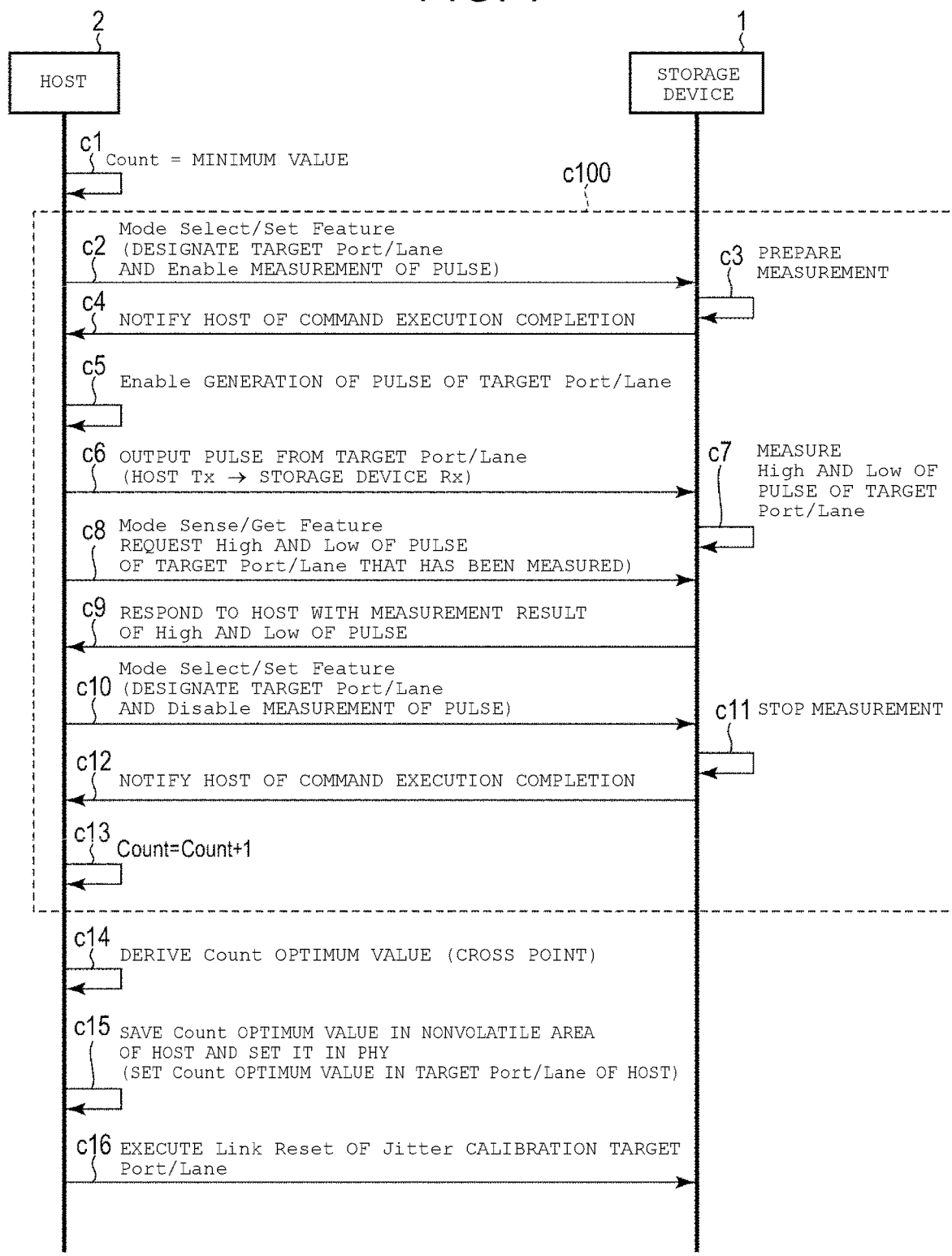
FIG. 7 is a process sequence diagram showing a flow of calibration for a pulse signal output from a host, which is executed in an information processing system according to a first embodiment.

FIG. 7 is a sequence diagram of example calibration for a pulse signal output from the transmission circuit Tx of the host 2, which is executed in cooperation with the storage device 1 and the host 2 in the information processing system SYS of the first embodiment. As in the case of calibration for the pulse signal output from the transmission circuit Tx of the storage device 1 (FIG. 6), a port/lane other than the target port/lane is used for each command and response.

The host 2 (calibration processing program 200) first sets the minimum value Count in the register 403 of the PHY 231 for the target port/lane (c1). The host 2 repeats the process (c2 to c13) while changing the Count up to the maximum value. The processes c2 to c13 are surrounded by the dashed rectangle c100 in FIG. 7.

The host 2 issues, to the storage device 1, a command (e.g., Mode Select or Set Feature) for designating a target port/lane and starting the measurement of the pulse signal (c2). That is, the host 2 requests the measurement of the high amplitude value and the low amplitude value of the pulse signal output to the transmission circuit Tx of the target port/lane. In other words, the pulse signal input to the reception circuit Rx of the target port/lane in the storage device 1 is measured. The storage device 1 (more particularly, calibration processing unit 121 in this example) prepares to measure the pulse signal (c3), and then notifies the host 2 of the command execution completion (c4) once the preparation is completed.

Upon receipt of the command execution completion from the storage device 1, the host 2 enables the generation of the pulse signal of the target port/lane (c5). This setting is executed with respect to the PHY 231. With this setting, the host 2 outputs the pulse signal from the transmission circuit Tx of the target port/lane 401 (c6).

The storage device 1 measures the high amplitude value and the low amplitude value of the pulse signal input to the reception circuit Rx of the target port/lane (c7). The host 2 issues, to the storage device 1, a command (e.g., Mode Sense or Get Feature) for requesting the measurement results for the high amplitude value and the low amplitude value of the pulse signal received by the reception circuit Rx of the target port/lane in the storage device 1 for which the measurement was requested in c2 (c8). For example, the host 2 issues a command (e.g., Mode Sense or Get Feature) after a certain period of time has elapsed after the pulse output of c6. In this context, "Mode Sense" is a command defined in SAS, and "Get Feature" is a command defined in NVMe. These are examples, and the present disclosure is not limited thereto. After such commands are received, the storage device 1 responds to the host 2 with the high amplitude value and the low amplitude value of the pulse signal as measured in c7 (c9).

Upon receipt of the measurement result, the host 2 issues, to the storage device 1, a command (e.g., Mode Select or Set Feature) for designating a target port/lane and stopping the measurement of the pulse signal (c10). The storage device 1 that has received such a command stops the measurement of the pulse signal being input to the reception circuit Rx of the target port/lane (c11) and then notifies the host 2 of the command execution completion (c12).

The host 2 increments the Count value (c13) and repeats the processes from c2. When the Count value reaches the maximum value, the host 2 exits the loop of the processes c2 to c13 (group surrounded by the dashed rectangle indicated by the reference numeral c100), and derives an optimum value of Count for the pulse signal output from the transmission circuit Tx of the host 2 based on the result of the measurement received in c9 (c14).

The host 2 saves the derived Count optimum value in a nonvolatile area of the host 2, such as the BIOS-ROM implemented as flash memory or the like, and sets it in the register 403 of the PHY 231 (c15). When the setting is completed, the host 2 executes a Link Reset process with the storage device 1 to initialize the target port/lane (c16).

In this way, under the handling of the host 2, the storage device 1 and the host 2 cooperate with each other to implement calibration of the pulse signal output from the transmission circuit Tx of the host 2 (see also FIG. 3).

In the information processing system SYS of the first embodiment, the storage device 1 and the host 2 can cooperate with each other to set the Counts for both the storage device 1 and the host 2 to the optimum values for the target port/lane. That is, the information processing system SYS of the present embodiment can thus appropriately adjust the duty ratio of the pulse signal output to the transmission line such as the interface 3.

The calibration for the storage device 1 side (FIG. 6) and the calibration for the host 2 side (FIG. 7) may be executed one by one in order or in parallel.

Second Embodiment

For example, when the interface 3 is SAS, both the PHY 111 of the storage device 1 and the PHY 231 of the host 2 are provided with counters such as "Invalid Dword" or "Running Disparity" for counting various errors detected for the signals input to the reception circuits Rx of the paired ports/lanes 301 and 401. These counters are provided, for example, in the registers 303 and 403. In the storage device 1, the information of these counters can be recorded as S.M.A.R.T (Self-Monitoring, Analysis and Reporting Technology) information.

An error event at the interface 3 counted by the counters provided in the PHYs 111 and 231 may also be referred to as an I/F ERROR. If the number of I/F ERRORs counted increases, the duty ratios of the pulse signals by the DCC circuits 302 and 402 may have not been sufficiently adjusted and there may be a problem with the jitter in the signal being communicated.

Therefore, in the information processing system SYS of the second embodiment, the number of I/F ERRORs is counted and monitored during the period when the communication between the storage device 1 and the host 2 is in an idle state, and if a large number of I/F ERRORs are detected, calibration is executed for the corresponding ports/lanes 301 and 401 during the idle state.

Figure 8:
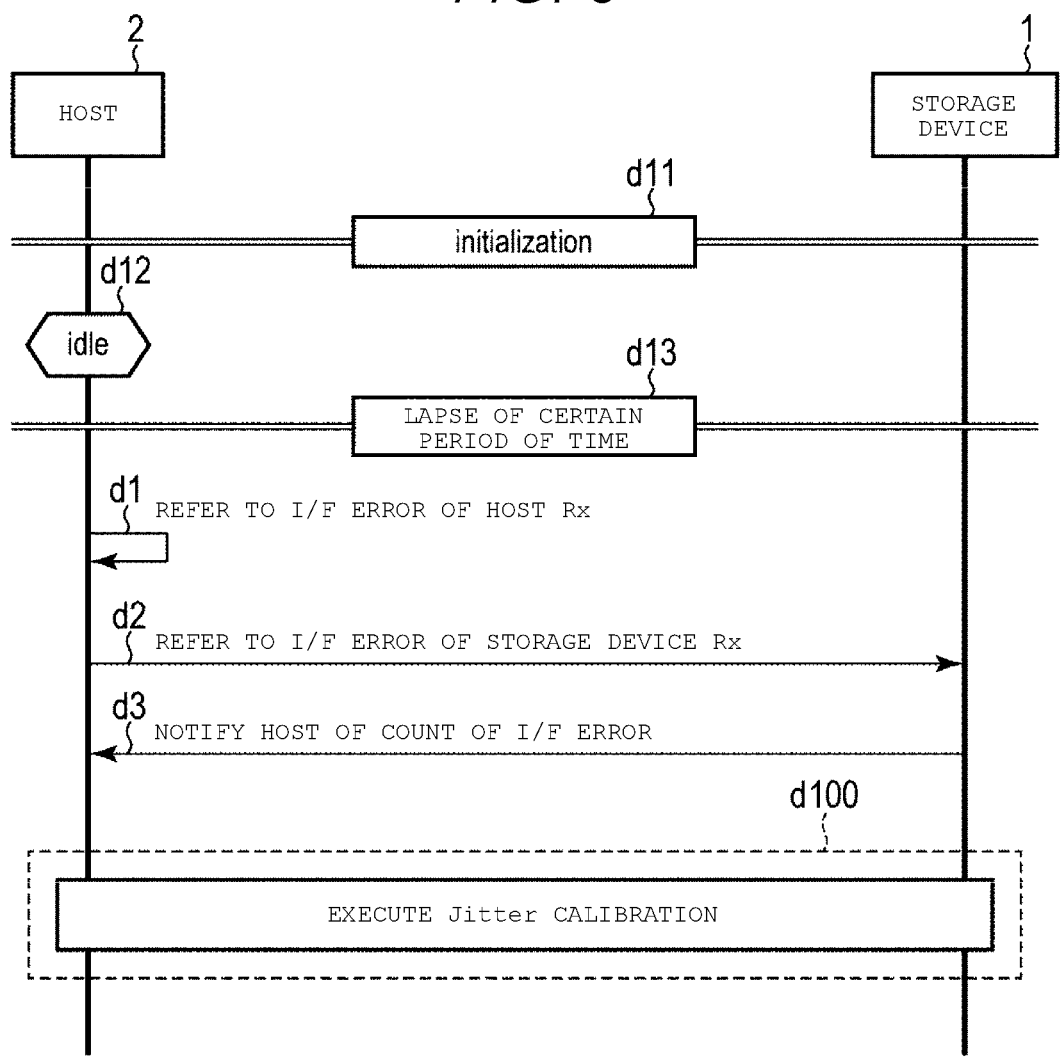
FIG. 8 is a process sequence diagram showing a flow of calibration in an information processing system of a second embodiment.

FIG. 8 is a sequence diagram of example calibration in the information processing system SYS of the second embodiment.

In this example, it is assumed that, after initialization of the ports/lanes 301 and 401 is performed between the storage device 1 and the host 2 (d11), the communication between the storage device 1 and the host 2 enters an idle state (d12), and then a certain period of time elapses in the idle state (d13).

After this elapse of time in the idle state, the host 2 (or more particularly the calibration processing program 200 in this example) refers to the number of I/F ERRORs counted by the counter in the PHY 231 (d1). The host 2 issues, to the storage device 1, a command for referring to the number of I/F ERRORs counted in the storage device 1 (d2). When this command is received, the storage device 1 (or more particularly the calibration processing unit 121 in this example) notifies the host 2 of the number of I/F ERRORs counted by the counter in the PHY 111 (d3).

When either one of the number of I/F ERRORs on the host 2 side or the number of I/F ERRORs on the storage device 1 side exceeds a threshold value for a certain port/lane and the calibration for the port/lane has not yet been executed, the host 2 executes the calibration (see FIGS. 6 and 7) as described in the first embodiment (d100).

Accordingly, in the information processing system SYS of the second embodiment, there is a possibility of improving signal quality by detecting the frequent I/F ERRORs and executing calibration while the communication between the storage device 1 and the host 2 is in an idle state.

Third Embodiment

The information processing system SYS of the third embodiment aims to further improve the signal quality by combining the calibration processing of the first embodiment with a method of detecting signal attenuation based on parameters of a decision feedback equalization (DFE) circuit described in Japanese Patent Application No. 2017-171577 (JP-A-2019-46389) filed by the applicant of the present application.

The DFE circuit is provided in the reception circuit Rx and provides an output equivalent to a signal distorted being in the process of passing through the transmission line such as interface 3. When the attenuation of the pulse signal input to the reception circuit Rx is detected based on the parameters of the DFE circuit (for example, a feedback coefficient), using a technique such as pre-emphasis, calibration is executed to raise the output level of the pulse signal from the transmission circuit Tx corresponding to the reception circuit Rx. This calibration is referred to as DFE calibration. The combination of the calibration (or the jitter calibration) in the first embodiment and the DFE calibration is referred to as jitter-DFE calibration. The information processing system SYS of the third embodiment determines whether or not the jitter-DFE calibration is necessary during a period when the communication between the storage device 1 and the host 2 is in the idle state, and if it is determined to be necessary, the jitter-DFE calibration is executed.

Figure 9:
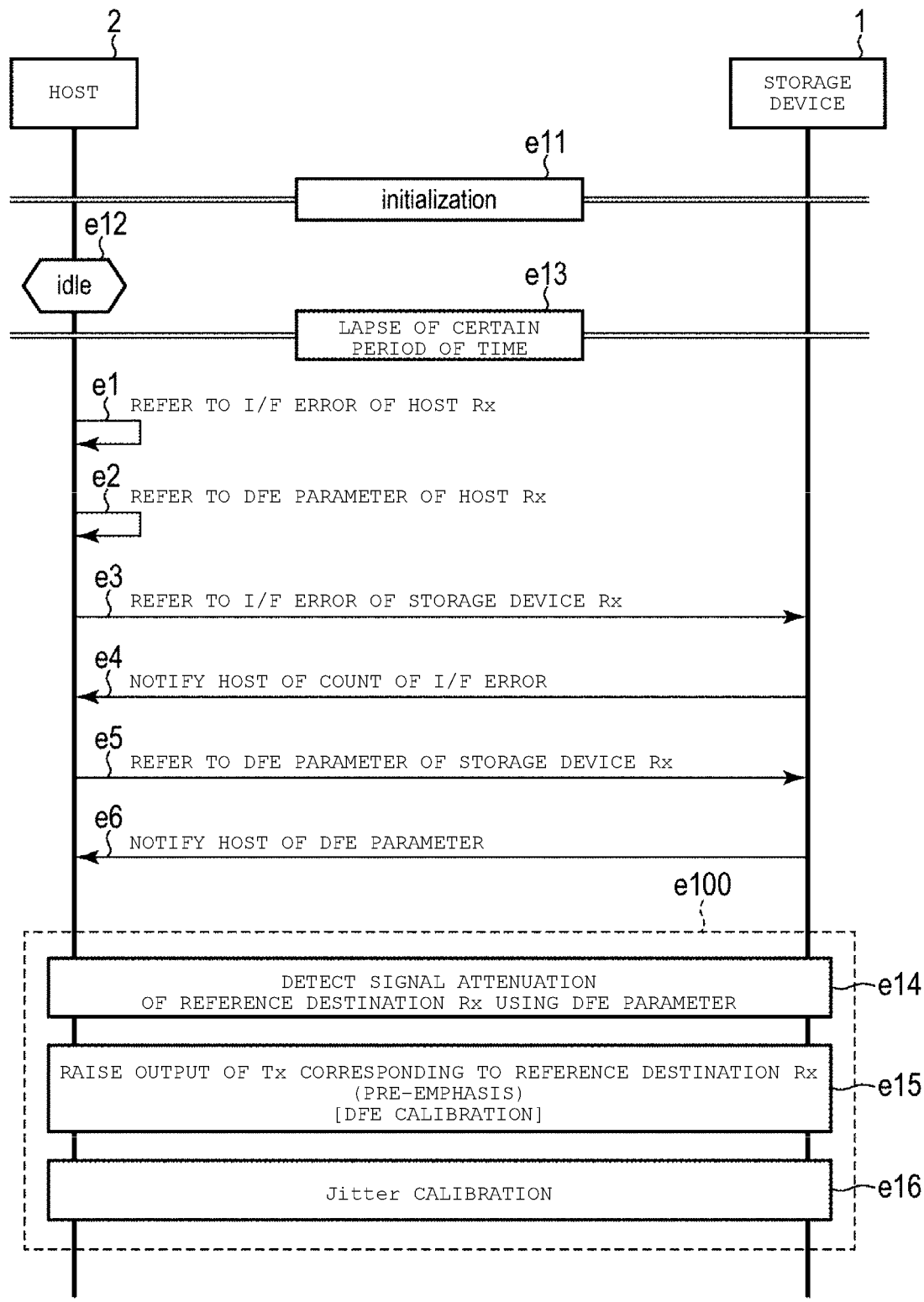
FIG. 9 is a process sequence diagram showing a flow of a jitter-DEF calibration executed in an information processing system of a third embodiment.

FIG. 9 is a sequence diagram of example jitter-DEF calibration executed in the information processing system SYS of the third embodiment.

After initialization of the ports/lanes 301 and 401 is performed between the storage device 1 and the host 2 (e11), the communication between the storage device 1 and the host 2 enters an idle state (e12) at any timing, and a certain period of time elapses in the idle state (e13).

Following the elapse of time in the idle state, the host 2 (more particularly, the calibration processing program 200 in this example) refers to the number of I/F ERRORs counted by the counter in the PHY 231 (e1). Further, the host 2 refers to the parameters of the DFE circuit of the reception circuit Rx on the host 2 side (e2).

Subsequently, the host 2 issues, to the storage device 1, a command for referring to the number of I/F ERRORs that have been counted in the storage device 1 (e3). When this command is received, the storage device 1 (or more particularly the calibration processing unit 121 in this example) notifies the host 2 of the number of I/F ERRORs counted by the counter in the PHY 111 (e4). The host 2 then issues, to the storage device 1, a command for referring to the parameters of the DFE circuit of the reception circuit Rx on the storage device 1 side (e5). Upon receipt of this command, the storage device 1 notifies the host 2 of the parameters of the DFE circuit on the storage device 1 side (e6).

When at either one of the number of I/F ERRORs on the host 2 side or the number of I/F ERRORs on the storage device 1 side exceeds a threshold value in a certain port/lane, the host 2 executes the jitter-DEF calibration (e100).

For example, the host 2 detects the attenuation of one or both of the pulse signal input to the reception circuit Rx on the host 2 side and the pulse signal input to the reception circuit Rx on the storage device 1 side based on the parameters of the DFE circuit on the host 2 side and the parameters of the DFE circuit on the storage device 1 side (e14). A reference destination Rx in FIG. 9 is the reception circuit Rx on the host 2 side or the reception circuit Rx on the storage device 1 side, which is the detection target. When signal attenuation is detected, the host 2 executes DFE calibration by using a technique such as pre-emphasis to raise the output level of the pulse signal from the transmission circuit Tx corresponding to the reception circuit Rx (e15). By this DFE calibration, the parameters of the DFE circuit of the reference destination Rx become the normal setting values.

The host 2 then executes jitter calibration (see FIGS. 6 and 7) described for the first embodiment (e16).

Accordingly, the information processing system SYS of the third embodiment is capable of further improving the signal quality by executing the jitter-DFE calibration, which is a combination of DFE calibration and jitter calibration.

Fourth Embodiment

While in the second embodiment and the third embodiment, the calibration is executed with the detection of the frequent I/F ERRORs acting as a trigger, the detection of any specific event(s) by the information processing system SYS (or by the host 2) does not have to be the trigger for executing the calibration. The information processing system SYS of the fourth embodiment executes the calibration upon a request by a user, such as a system administrator. Such a request is a trigger to start the calibration processing in this fourth embodiment.

Figure 10:
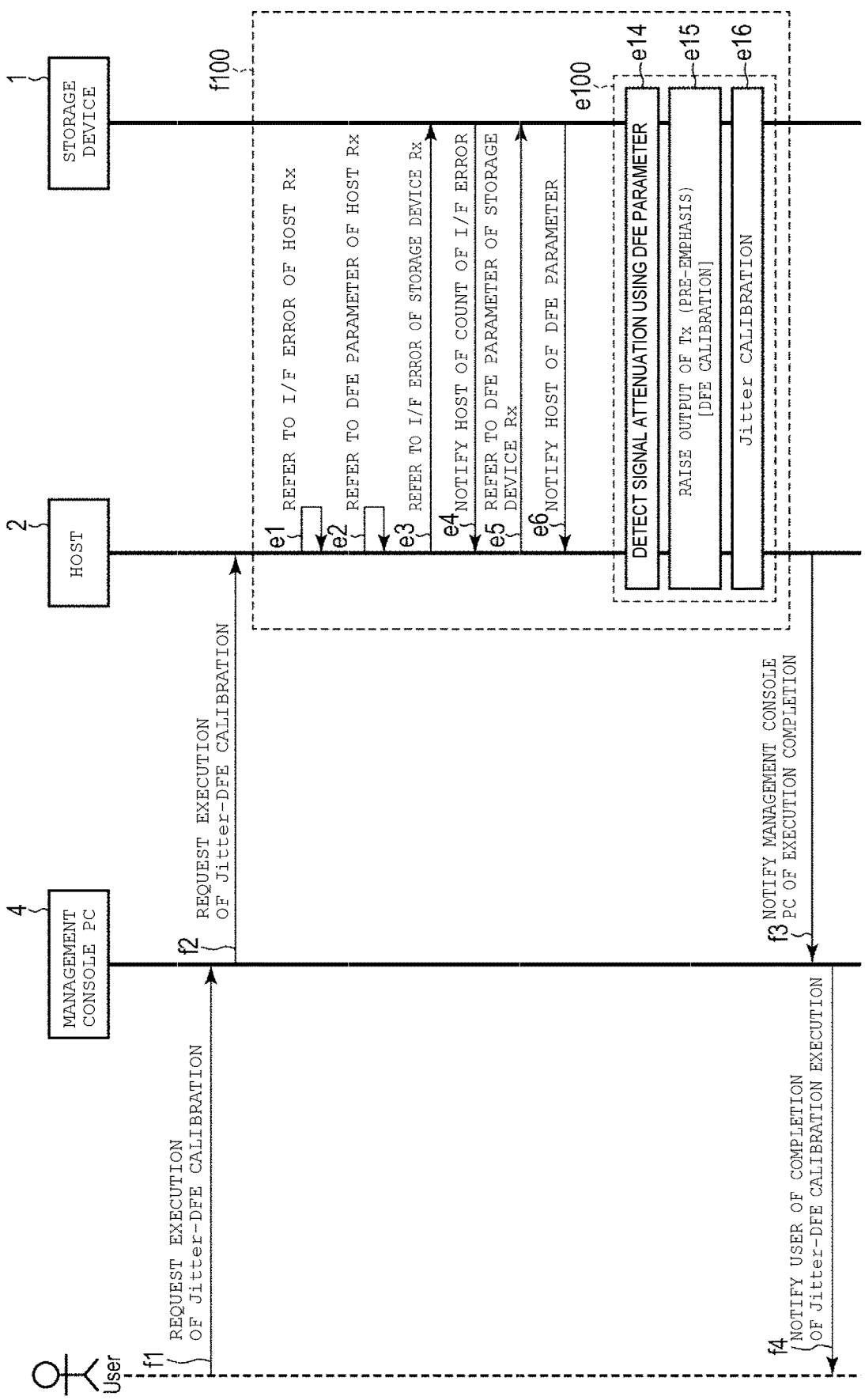
FIG. 10 is a process sequence diagram showing a flow of calibration in an information processing system of a fourth embodiment.

FIG. 10 is a sequence diagram of example calibration in the information processing system SYS of the fourth embodiment.

First, the user performs an operation to request execution of the jitter-DFE calibration between the host 2 and the storage device 1 by using, for example, a management console PC 4 that has a function of communicating with the host 2 (f1). The management console PC 4 that has received the user's operation requests for the host 2 to execute the jitter-DFE calibration (f2).

Upon receipt of the request from the management console PC, the host 2 cooperates with the storage device 1 to execute the jitter-DFE calibration (see FIG. 9) described in the third embodiment (f100). When the jitter-DFE calibration is completed, the host 2 notifies the management console PC 4 of the completion of the jitter-DFE calibration execution (f3).

The management console PC 4 notifies the user of the completion of jitter-DFE calibration execution, for example, through a display (f4).

Accordingly, in the information processing system SYS of the fourth embodiment, a user can execute jitter-DFE calibration in cooperation with the storage device 1 and the host 2 at any time.

In addition to jitter-DFE calibration, it is also possible for a user to individually request and execute jitter calibration or DFE calibration.

Fifth Embodiment

Figure 11:
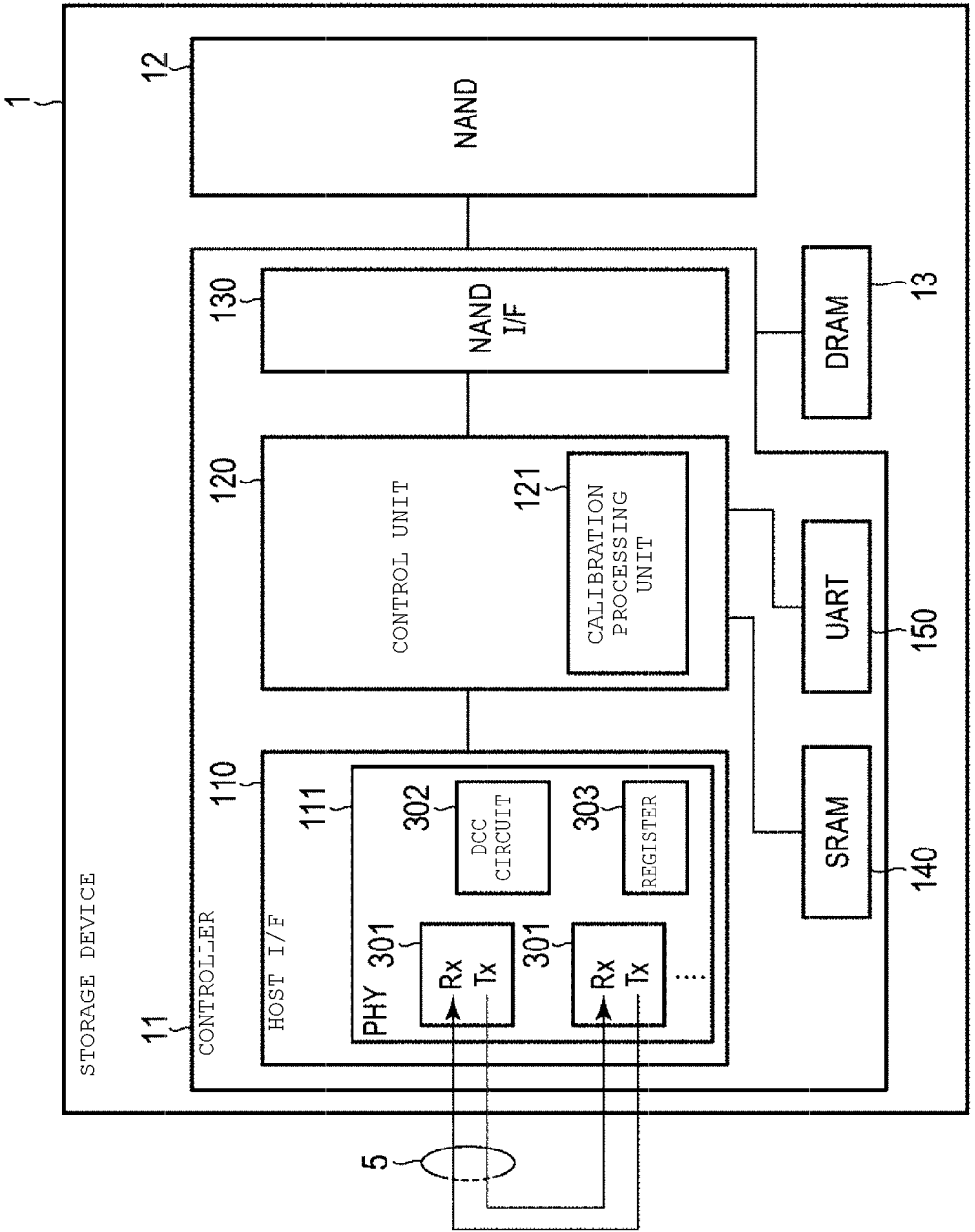
FIG. 11 depicts a state in which a storage device according to a fifth embodiment is loopback-connected.

In the first to fourth embodiments, the storage device 1 and the host 2 cooperate with each other to execute the calibration under the overall control of the host 2. In the fifth embodiment, the either the storage device 1 or the host 2 can execute the calibration by itself. FIG. 11 shows an example in which the storage device 1 executes calibration by itself according to the fifth embodiment.

In the first to fourth embodiments, the port/lane 301 of the storage device 1 and the port/lane 401 of the host 2 are directly connected, and the pulse signal output from one transmission circuit Tx is observed in the corresponding reception circuit Rx in both directions to derive the optimum value of each Count. In the fifth embodiment, two ports/lanes 301 in the storage device 1 are loopback-connected with each other by, for example, a cross cable 5, and the pulse signal output from one transmission circuit Tx of one of the two ports/lanes 301 is observed in the corresponding reception circuit Rx of the other one of the two ports/lanes 301 in both directions to derive the optimum value of each Count. This process can be internal to the storage device 1.

The calibration processing unit 121 of the storage device 1 of the fifth embodiment thus also has the same or substantially the same functions as those of the calibration processing program 200 of the host 2 described for the first to fourth embodiments. The storage device 1 (more particularly, the calibration processing unit 121 in this example) inputs a parameter for designating the target port/lane 301, a command for requesting execution of calibration, and the like via the UART 150.

For example, when two ports/lanes 301 are designated by a parameter and execution of calibration is requested by a command inputted via the UART 150, the storage device 1 outputs pulse signals from the transmission circuits Tx of the two ports/lanes 301 while changing each Count value from the minimum value to the maximum value and observes the pulse signals in the reception circuits Rx of the two ports/lanes 301. The storage device 1 searches for a cross point where the absolute value of the amplitude on the high side of the pulse signal matches the absolute value of the amplitude on the low side thereof and derives the Count value at the cross point as an optimum value.

Figure 12:
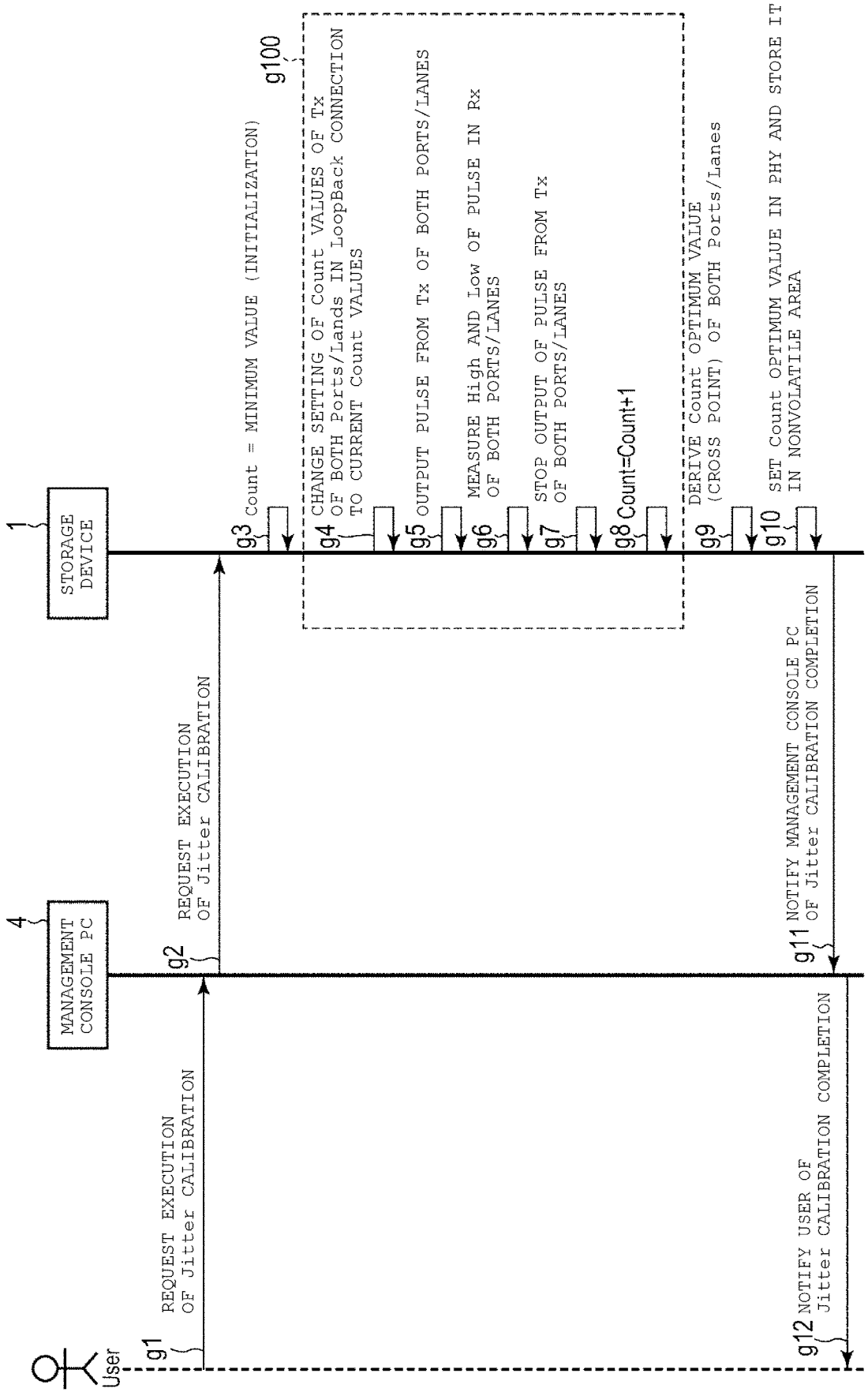
FIG. 12 is a process sequence diagram showing a flow of jitter calibration of a storage device of according to a fifth embodiment.

FIG. 12 is a sequence diagram of an example jitter calibration of the storage device 1 of the fifth embodiment.

First, a user such as a system administrator performs an operation to request execution of Jitter calibration by using the management console PC 4 that has a function of loopback-connecting two ports/lanes 301 of the storage device 1 and communicating with the storage device 1 via the UART 150 of the storage device 1 (g1). This operation may include designation of a port/lane. The management console PC 4 that has received the user's operation requests the storage device 1 to execute the jitter calibration (g2).

Upon receipt of the request, the storage device 1 (or the calibration processing unit 121) stores the minimum value of Count as an initial value (g3) in, for example, an area secured on the SRAM 140 for incrementing the Count from the minimum value to the maximum value. The storage device 1 repeats processes g4 to g8 until the Count stored in this area reaches the maximum value. The processes g4 to g8 are surrounded by the dashed rectangle g100 in FIG. 12.

After the initialization (g3), the storage device 1 changes the Count values of the pulse signals output from the transmission circuits Tx of both ports/lanes in the loopback connection to the current Count values stored in the area secured on the SRAM 140 or the like described above (g4). After changing the Count values, the storage device 1 outputs the pulse signals from the transmission circuits Tx of both ports/lanes (g5).

The storage device 1 measures a high amplitude value and a low amplitude value of each of the pulse signals received in the reception circuits Rx of the two ports/lanes 301 corresponding to the transmission circuits Tx that has outputted the pulse signals (g6). When the measurement is completed, the storage device 1 stops outputting the pulse signals from the transmission circuits Tx of both ports/lanes (g7).

The storage device 1 increments the Count value (g8) and repeats the processes from g4. When the Count value before increment reaches the maximum value, the storage device 1 exits the loop of the processes g4 to g8 and derives an optimum value of Count for the pulse signals output from the transmission circuits Tx for both ports/lanes based on the result of the measurement in g6 (g9). The storage device 1 sets the derived Count optimum value in the register 303 of the PHY 111 and stores it in a nonvolatile area such as in the NAND 12 (g10).

When the setting and the storing of the Count optimum value are completed, the storage device 1 notifies the management console PC 4 of the completion of the jitter calibration (g11). The management console PC 4 then notifies the user of the completion of jitter calibration, for example, through a display (g12).

Accordingly, in the fifth embodiment, the storage device 1 can execute the calibration processing by itself by loopback-connecting of the two ports/lanes 301 of the storage device 1. A similar configuration and sequence for the jitter calibration can be applied to the host 2 so that the host 2 can also be calibrated by itself by loopback-connecting two ports/lanes 401 of the host 2.

In addition to jitter calibration, jitter-DFE calibration and DFE calibration can also be executed by loopback connection.

In the above examples, an example of exchanging calibration and DFE related information using commands such as Mode Select or Set Feature and Mode Sense or Get Feature has been described. In other embodiments, it is also possible to exchange calibration and DFE-related information by extending the interface protocol to incorporate additional commands or exchanges. For example, in the case of the SAS protocol, a Coefficient change request of APTA or the like can be extended and substituted instead of the above commands.

While certain embodiments have been described, these embodiments have been presented by way of example only and are not intended to limit the scope of the disclosure. Indeed, the novel embodiments described herein may be embodied in a variety of other forms; furthermore, various omissions, substitutions and changes in the form of the embodiments described herein may be made without departing from the spirit of the disclosure. The accompanying claims and their equivalents are intended to cover such forms or modifications as would fall within the scope and spirit of the disclosure.

What is claimed is:

1. An information processing system, comprising:
   a host; and
   a storage device configured to transmit a first pulse signal to the host through a transmission line and receive a second pulse signal from the host through the transmission line, wherein
   the storage device comprises:
      a first register configured to store a value of a first parameter, and
      a first correction circuit configured to adjust a first duty ratio of the first pulse signal according to the value of the first parameter in the first register; and
   the host comprises:
      a second register configured to store a value of a second parameter,
      a second correction circuit configured to adjust a second duty ratio of the second pulse signal according to the value of the second parameter in the second register; and
      a first calibration processor configured to:
         measure a plurality of the first duty ratios of the first pulse signal as output from the storage device with the value of the first parameter being set in the first register to a plurality of different values;
         derive a first optimum value of the first parameter based on the measured first duty ratios adjusted according to the plurality of different values of the first parameter; and
         transmit the derived first optimum value to the storage device as the value of the first parameter to be stored in the first register.

2. The information processing system according to claim 1, wherein the storage device further comprises a second calibration processor configured to:
   measure a pulse width of the second pulse signal received from the host; and
   transmit the measured pulse width to the host.

3. The information processing system according to claim 2, wherein the first calibration processor of the host is further configured to:
   derive a second optimum value for the second parameter based on measured pulse widths received from the storage device; and
   store the derived second optimum value in the second register.

4. The information processing system according to claim 1, wherein the transmission line includes at least two ports or lanes, each port or lane comprising a signal line that carries a signal from the host to the storage device and a signal line that carries a signal from the storage device to the host.

5. The information processing system according to claim 4, wherein the first calibration processor is configured to transmit a command including a designation of a particular port or a lane to the storage device using a port or a lane that is different from the particular port or lane.

6. The information processing system according to claim 5, wherein the second calibration processor is configured to transmit, to the host, a response to the received command by using the port or the lane on which the command was received rather than the designated port or lane.

7. The information processing system according to claim 1, wherein
   the host includes a first counter,
   the storage device includes a second counter, and
   the first and second counters are configured to count a number of errors detected in a signal transmitted through the transmission line.

8. The information processing system according to claim 7, wherein the first calibration processor is further configured to check, during a period in which communication between the host and the storage device is in an idle state, whether a counted value of the first counter exceeds a first threshold value or a counted value of the second counter exceeds a second threshold value.

9. The information processing system according to claim 8, wherein the first calibration processor is further configured to derive at least one of the first optimum value or a second optimum value for the second parameter if either of the counted value in the first or second counters respectively exceeds the first or second threshold values.

10. The information processing system according to claim 7, wherein each of the host and the storage device includes a decision feedback equalizer configured to correct a signal received through the transmission line.

11. The information processing system according to claim 10, wherein the first calibration processor is further configured to:
  detect attenuation of the first pulse signal or the second pulse signal, based on a third parameter of the first decision feedback equalizer of the host or a fourth parameter of the second decision feedback equalizer of the storage device, before deriving the first optimum value of the first parameter or a second optimum value for the second parameter; and
  raise an output level of the first or second pulse signal at a transmission source of the first or second pulse signal for which the attenuation is detected.

12. A storage device, comprising:
  a register configured to store a value of a parameter for adjusting a duty ratio of a pulse signal output to a transmission line;
  a correction circuit configured to adjust the duty ratio of a first pulse signal to be transmitted on the transmission line, the duty ratio being set based on the value of the parameter in the register; and
  a calibration processor configured to:
    in response to a first instruction from a host capable of being connected through the transmission line, output the first pulse signal to the transmission line at a plurality of duty ratios as set by the correction circuit using a plurality of different values for the parameter;
    in response to a second instruction from the host, store a first optimum value as the value of the parameter in the register; and
    in response to a third command received from the host, measure a duty ratio of a second pulse signal received from the host; and
    transmit a result of the measurement to the host.

13. A calibration method, comprising:
  issuing, from a host device to a storage device, a first command to change a value of a first parameter stored in a first register of the storage device, the parameter controlling a duty ratio of a first pulse signal to be output from the storage device on a transmission line;
  outputting, from the storage device to the host device on the transmission line, the first pulse signal with a plurality of different duty ratios set according to a plurality different values of the parameter as changed in response to the first command from the host device;
  measuring a plurality of duty ratios of the first pulse signal received from the storage device and deriving a first optimum value of the parameter based on the measured duty ratios for the plurality of different values of the parameter;
  setting the derived first optimum value of the parameter as the value of the parameter stored in the first register, in response to a second command from the host device;
  measuring a duty ratio of a second pulse signal received from the host; and
  transmitting a result of the measurement to the host.

14. The calibration method according to claim 13, further comprising measuring, at the host device, high and low amplitude values of the first pulse signal received from the storage device.

15. The calibration method according to claim 13, further comprising:
  using a command from the host device to designate a particular port or lane of the transmission line to receive the outputting of the first pulse signal.

16. The calibration method according to claim 15, wherein the command to designate the particular port or lane is received by the storage device on a different port or lane from the particular port or lane designated by the command.

17. The calibration method according to claim 13, wherein the second command is a Set Feature command that is a defined command in a NVM Express standard.

18. The calibration method according to claim 13, wherein the second command is a Mode Select command that is a defined command in a Serial Attached SCSI standard.

* * * * *